United States Patent
Cashin et al.

[15] 3,673,867
[45] July 4, 1972

[54] HUMIDITY RESPONSIVE ELEMENT

[72] Inventors: William F. Cashin, Brooklyn Center; James R. Mourning, Minneapolis, both of Minn.

[73] Assignee: Honeywell Inc., Minneapolis, Minn.

[22] Filed: Oct. 15, 1970

[21] Appl. No.: 81,097

[52] U.S. Cl. .............................73/337, 117/66, 117/132 C
[51] Int. Cl. ...........................................G01n 19/10
[58] Field of Search...............73/377.5, 337; 117/66, 132 C, 117/132 CB, 132 CF, 132 R; 156/169, 212; 161/410

[56] References Cited

UNITED STATES PATENTS

| | | | |
|---|---|---|---|
| 2,506,026 | 5/1950 | Kifer | 156/169 |
| 2,931,226 | 4/1960 | Sadow | 73/337 |
| 2,573,685 | 11/1951 | Blinn | 73/337 |

*Primary Examiner*—Louis R. Prince
*Assistant Examiner*—Denis E. Corr
*Attorney*—Lamont B. Koontz and Robert S. Craig

[57] ABSTRACT

A humidity responsive element made of a strip of nylon secured to a strip of phosphor bronze. The bi-material element is heated treated after being formed into a spiral to improve the bond and stabilize its response to humidity changes.

6 Claims, 1 Drawing Figure

PATENTED JUL 4 1972 3,673,867
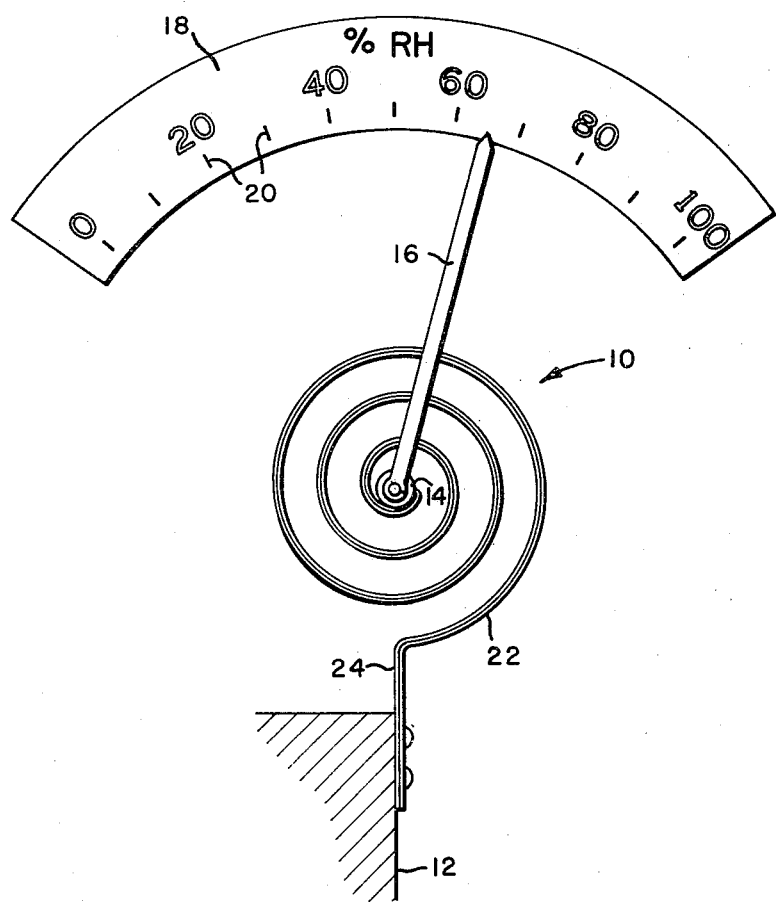
INVENTOR.
WILLIAM F. CASHIN
JAMES R. MOURNING
BY Robert S Craig
ATTORNEY.

HUMIDITY RESPONSIVE ELEMENT

Humidity responsive elements made of a layer of thermoplastic material bonded to a metal strip are known as mentioned in Blinn et al. U.S. Pat. No. 2,573,685 but they have not been fully successful due to imperfect bonding and inconsistent response to humidity changes. In order to make inexpensive elements in quantity that can be assembled into an instrument having a humidity indicating scale of predetermined length, it is necessary that the elements have uniform response, not only from one element to another but of individual elements over a period of time.

It has been found that even though a plastic layer is firmly bonded to a metal strip, subsequent forming of the bi-material into a coil tends to impair the integrity of the bond. It was discovered that subsequent heat treatment, preferably to melt the plastic, establishes a good bond and additionally improves consistency of humidity response.

The single FIGURE of the drawing shows a relative humidity indicator having a bi-material sensing element.

A spiral humidity responsive element 10 has its outer end secured to a support 12. The inner free end of the element 10 is secured to a hub 14 which carries a pointer 16. A scale plate 18 has suitable indicia 20 of relative humidity disposed thereon for cooperation with the pointer 16. The pointer 16 may have an adjustable connection with the hub 14 to provide for calibration of the instrument.

The element 10 consists of a metal strip 22, preferably of phosphor Bronge, which is a copper and tin alloy to which is secured a thermoplastic strip 24, preferably of nylon. While shown as having substantial thickness, a successful element has actually been made of metal and plastic layers each 0.003 inch thick. Such an element is not only relatively more active than would be a thicker one, but responds more rapidly to changes in relative humidity.

The plastic strip 24 may be attached to the metal strip 22 with the materials in heated condition to obtain a bond between the metal and plastic. Ordinarily this done with the metal in an original substantially flat condition. The temperature may be high enough to fuse the plastic. With the plastic adhered to the metal the bi-material is formed into a usable shape, as shown here, a coil of spiral configuration. While elements of this condition will respond to humidity changes they were found to be of generally poor quality, as to the integrity of the bond, as to uniformity of response to changes in humidity, and as to stability of individual elements over a period of time.

According to the invention the bi-material elements are reheated after being coiled to their final shape. It was discovered that a proper heat treatment at this point in manufacture produced a much higher percentage of elements having a predetermined desired response to humidity change than previously obtained. In general, this proper heat treatment uses a temperature slightly above the melting point of the plastic to produce the best results. Elements so treated permit the use of hygrometers having a scale of fixed length to produce relative humidity indications of acceptable accuracy. Thus, in the illustrated instrument, if the pointer 16 is set to read correctly at one point it will also read substantially correctly at the other points on the scale. The described heat treating also improved the bond between the two materials and also provided elements that changed little with age.

The embodiments of the invention in which an exclusive property or right is claimed are defined as follows:

1. A coiled humidity responsive element made of a strip of thermoplastic material attached to one side only of a metal strip to form a bi-material element which is secured at one end to provide movement at another end which is free upon a change in humidity,
   said coiled humidity element having been raised to a temperature above the melting point of the thermoplastic material after said bi-material element has been formed into a coil.
2. A humidity responsive element according to claim 1 in which the thermoplastic material is heat bonded to the metal strip prior to being formed into a coil.
3. A humidity responsive element according to claim 1 in which the two strips forming said bi-material element are nylon and Phosphor Bronze.
4. A humidity responsive element according to claim 2 in which the two strips are nylon and Phosphor Bronze.
5. A humidity responsive element according to claim 1 in which the coil of bi-material element is in the shape of a spiral.
6. A humidity responsive element according to claim 1 in which the thermoplastic material is fused to the metal strip prior to being formed into a coil.

* * * * *